Figure 1:
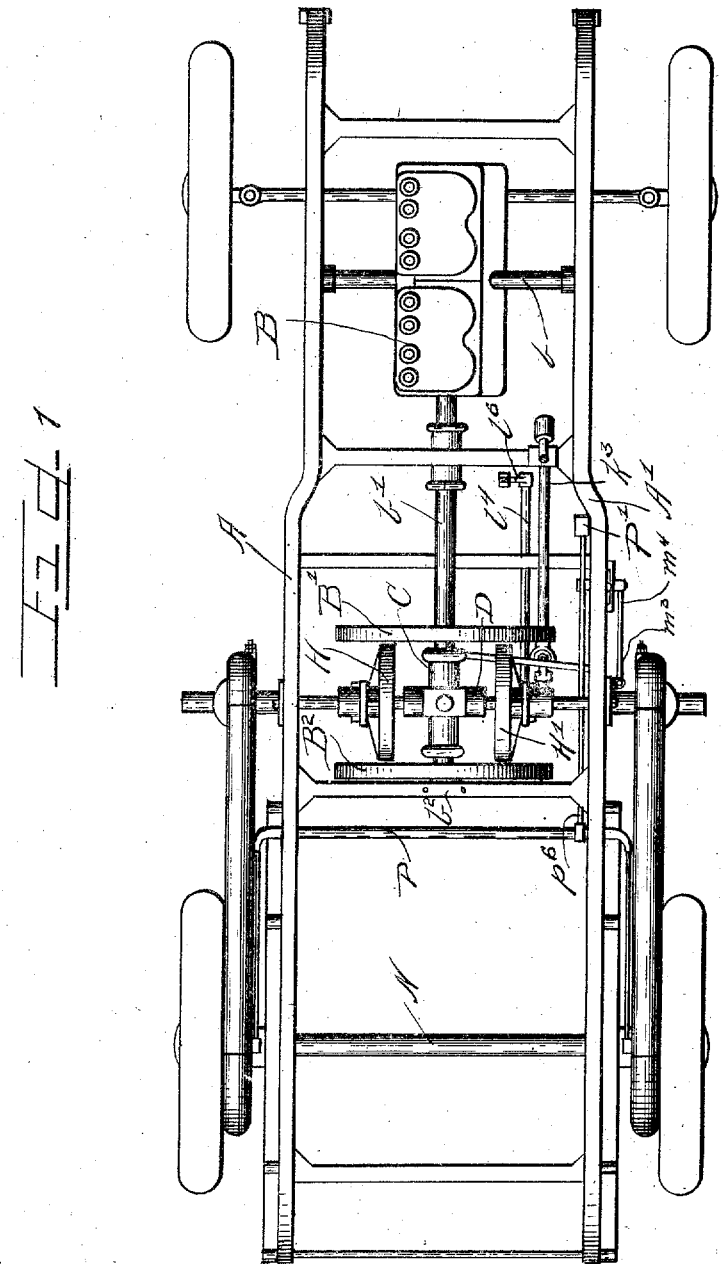

No. 882,513. PATENTED MAR. 17, 1908.
W. O. WORTH.
POWER TRANSMITTING MECHANISM.
APPLICATION FILED NOV. 21, 1906.

8 SHEETS—SHEET 4.

WITNESSES
J. W. Angell.
L. E. Nunnall.

INVENTOR
William O. Worth.
by Charles W. Fries
Atty.

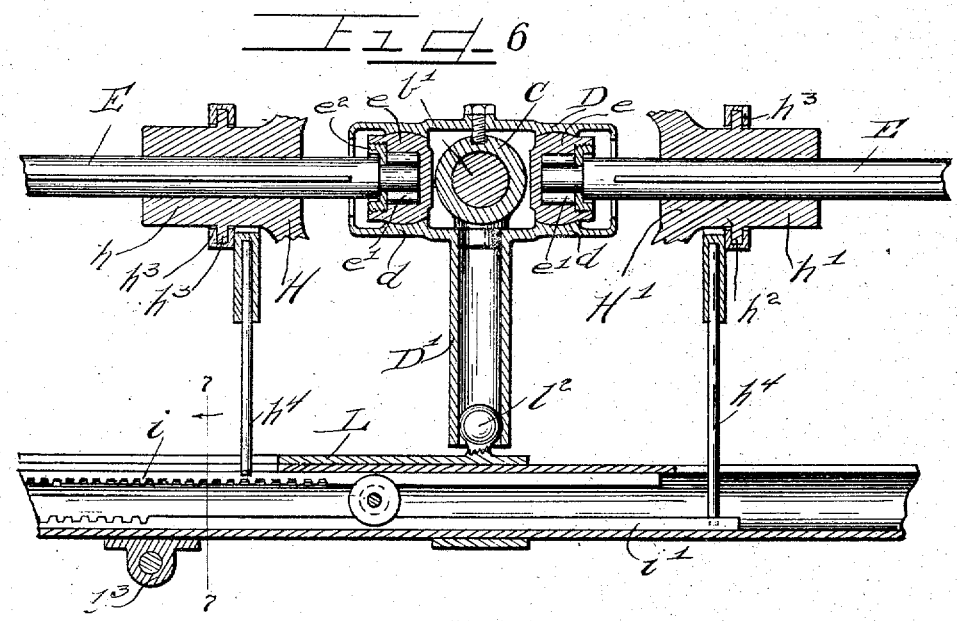

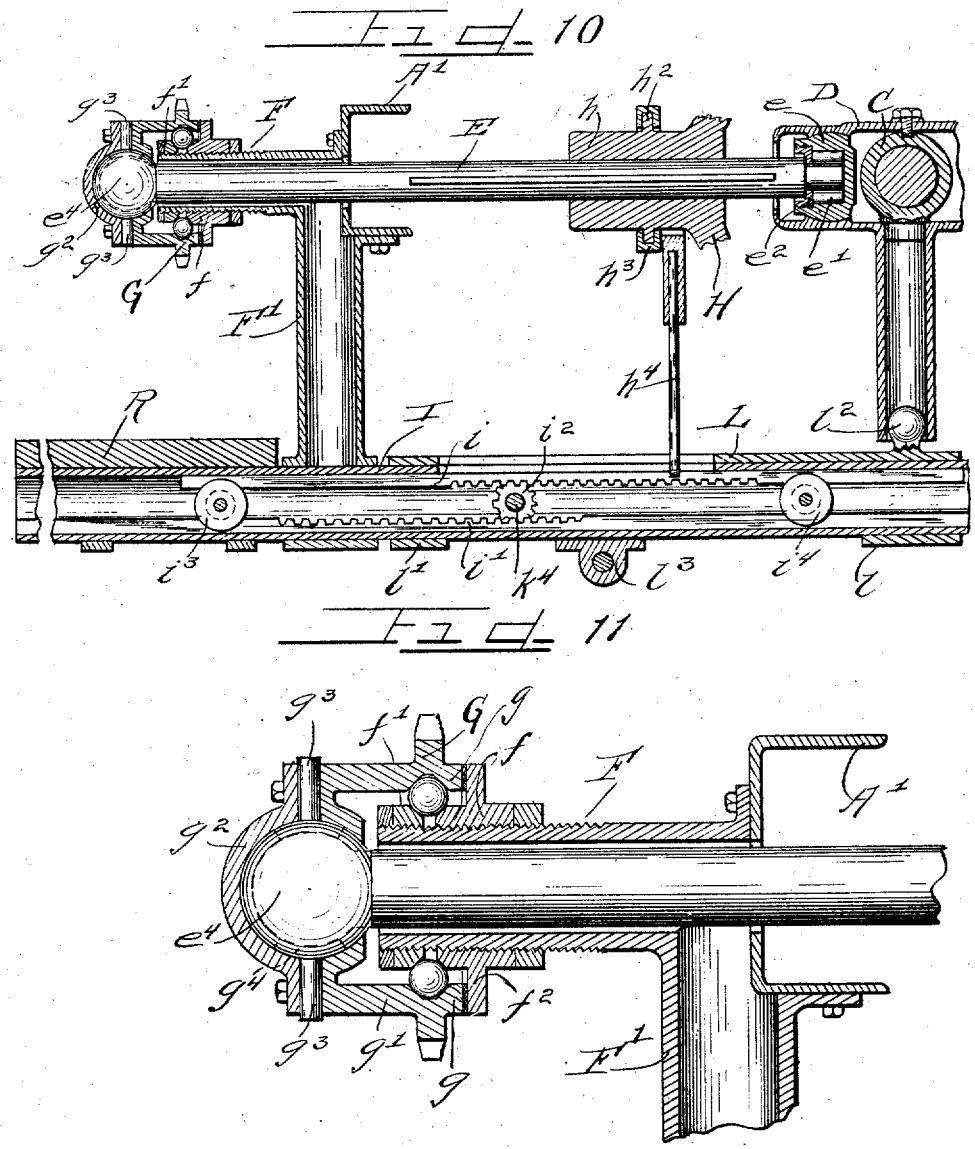

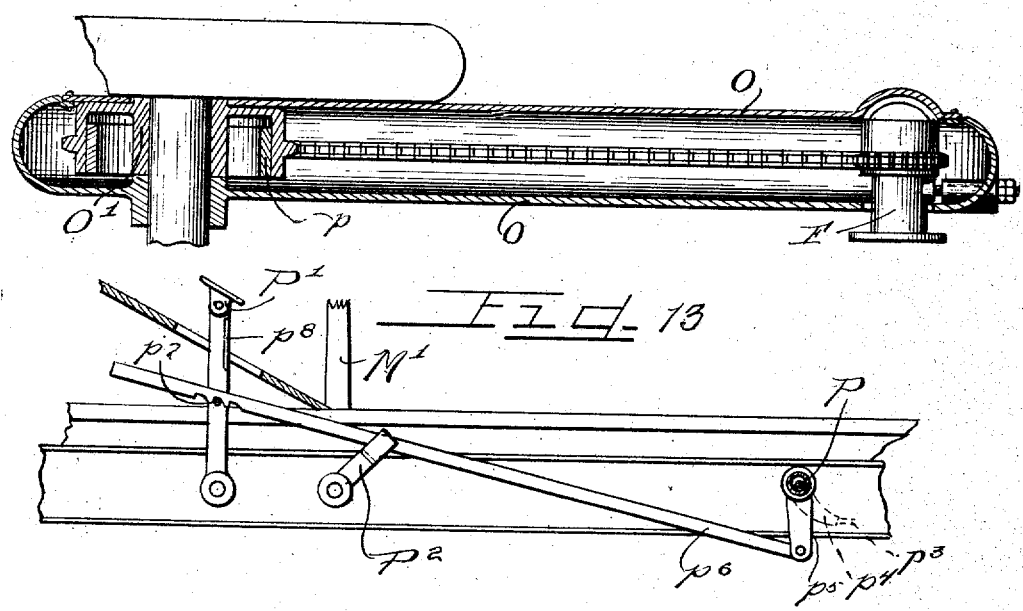

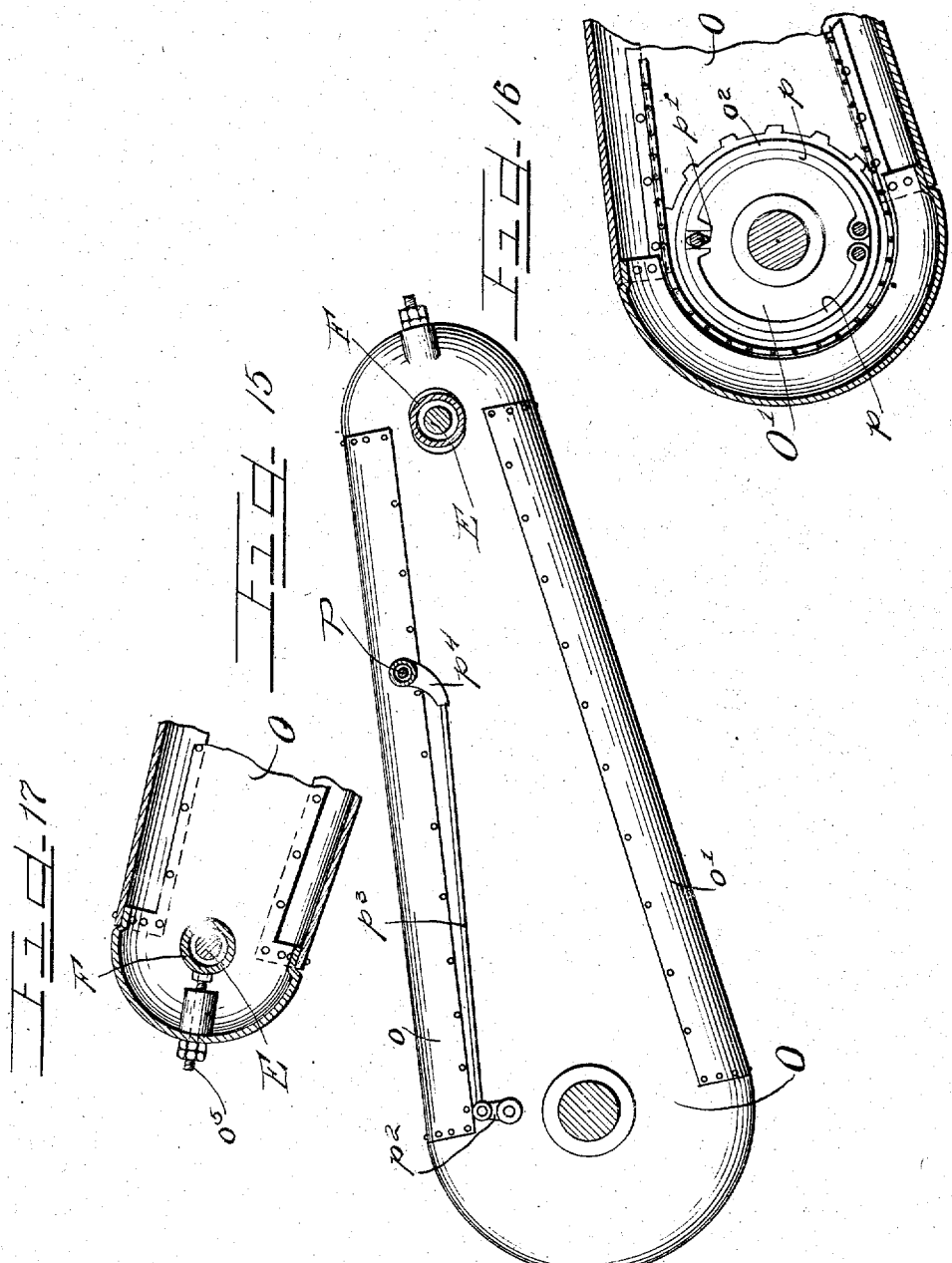

UNITED STATES PATENT OFFICE.

WILLIAM O. WORTH, OF EVANSVILLE, INDIANA.

POWER-TRANSMITTING MECHANISM.

No. 882,513.  Specification of Letters Patent.  Patented March 17, 1908.

Application filed November 21, 1906. Serial No. 344,428.

*To all whom it may concern:*

Be it known that I, WILLIAM O. WORTH, a citizen of the United States, and a resident of the city of Evansville, in the county of Vanderburg and State of Indiana, have invented certain new and useful Improvements in Power-Transmitting Mechanisms; and I do hereby declare that the following is a full, clear, and exact description of the same, reference being had to the accompanying drawings, and to the letters of reference marked thereon, which form a part of this specification.

This invention relates to improvements in power transmitting mechanisms and is shown more particularly as a transmission mechanism for automobiles though obviously adaptable for other purposes. The many types of driving and transmitting mechanisms heretofore devised for the purpose described may be roughly divided into two classes, namely those employing spur gears and those relying upon friction to transmit the power from the motor to the driving wheels.

In the case of geared transmission mechanisms frequent trouble occurs owing to the stripping of the gears and it is not uncommon with some types of such transmission mechanisms that but a very small part of power actually developed by the motor is capable of being delivered to the driving wheels. Furthermore with gear transmission great care must be exercised in starting the automobile and shifting from one speed to another to avoid injury to the motor as well as the transmission mechanism.

The object of this invention is to provide a frictional transmission mechanism of the class set forth in the prior application of John D. Worth and myself for patent, Multiple friction transmission gears, filed on the 26th day of March 1906, Serial No. 308,003, and in which a plurality of driven friction members are capable of adjustment to oppositely engage opposite driving friction members.

It is an object of this invention to provide positively supported driven friction members adjustable mutually into engagement with a forwardly and a rearwardly disposed driving friction member, and to be so adjusted as to accelerate the speed automatically when the transmission mechanism is brought into use.

It is a further object of the invention to afford in connection with the transmission mechanism described, bearings for the driven friction members whereby the means for transmitting power from the same to the rear wheels operate equally well, whatsoever the adjustment of said friction members.

It is a further object of the invention to provide in connection with a device of the class described a reach rod which insures the driving chain acting at all times at uniform tension and which covers and protects the driving chains and sprockets from dust, dirt and sand.

Finally it is the object of this invention to afford in a device of the class described an automatically acting transmission mechanism of cheap, simple and extremely durable construction and which at all times acts positively and affords a brake of great power, when desired, capable of instant and safe use.

It is a further object of the invention to afford simple, positive and quick acting means for actuating the driven elements into and out of engagement with the driving friction members.

The invention embraces many novel features and consists in the matters hereinafter described and more fully pointed out and defined in the appended claims.

Figure 2:
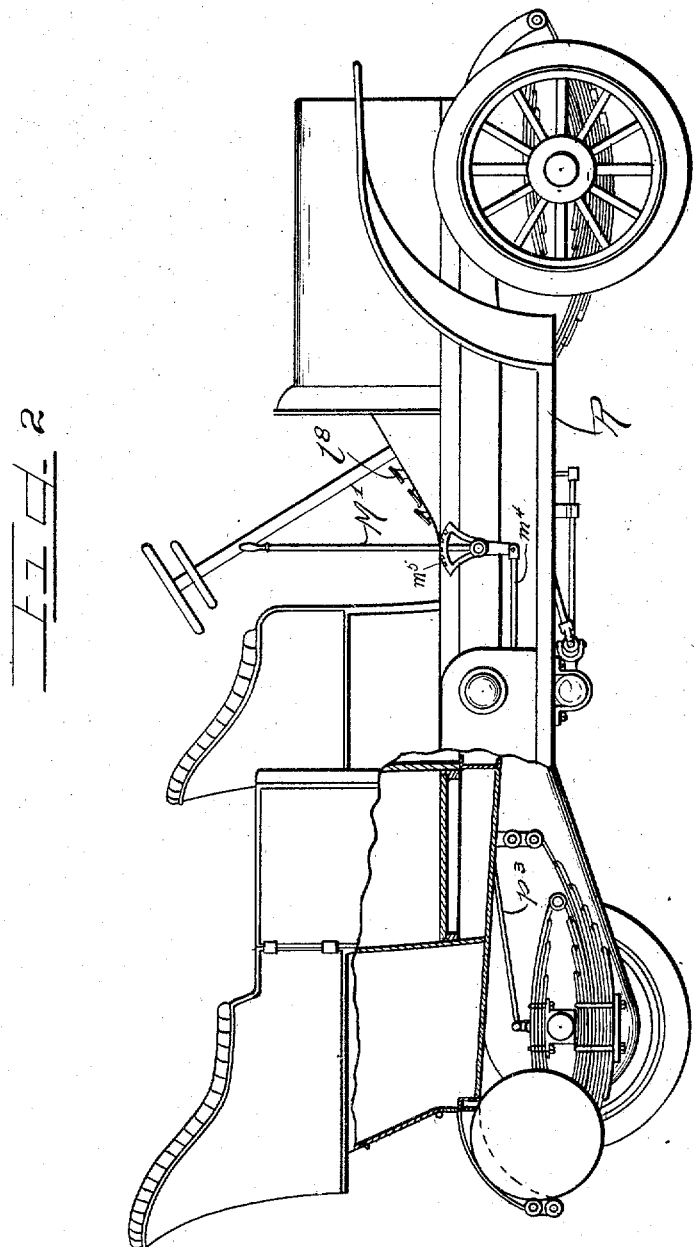
Figure 3:
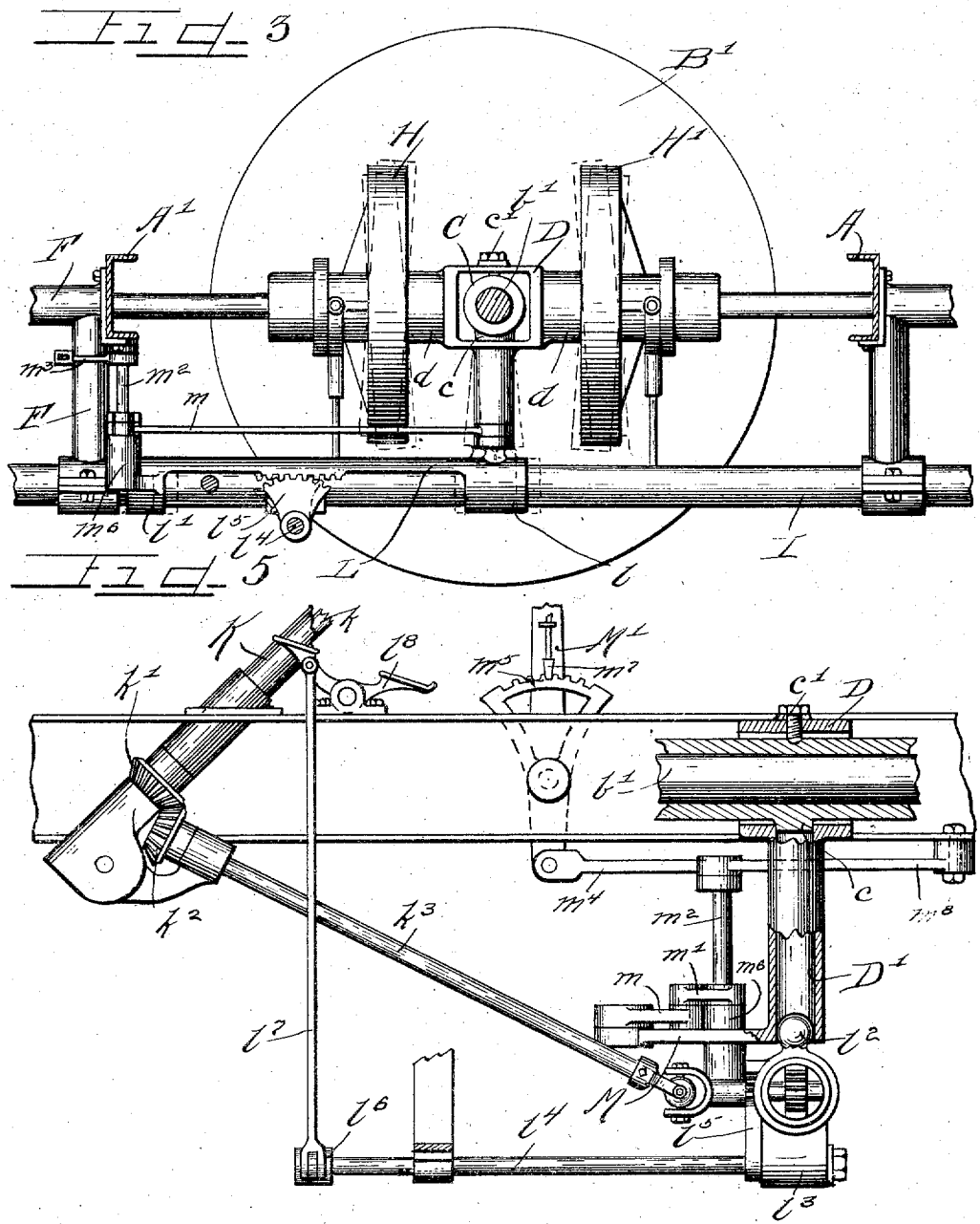
Figure 4:
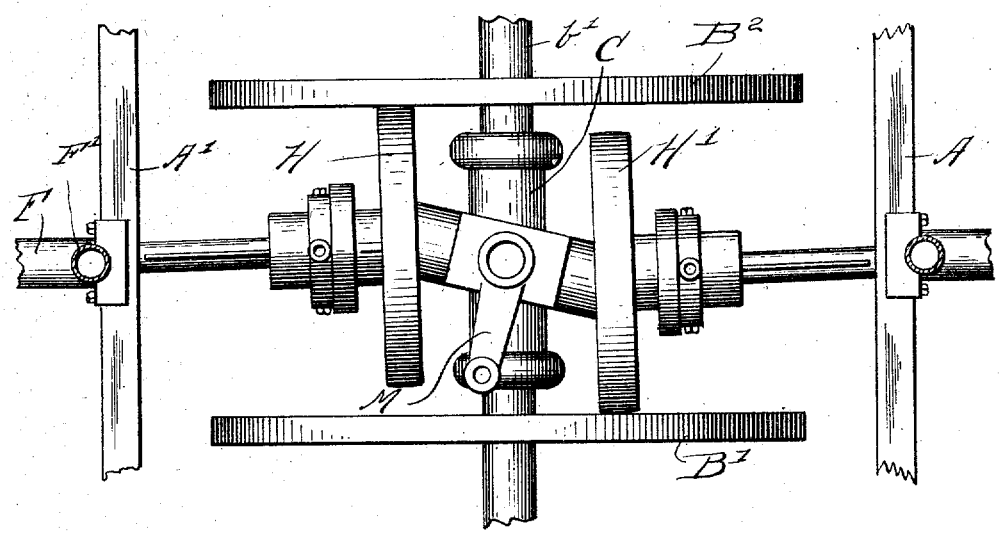

In the drawings, Figure 1 is a top plan view of the chassis of an automobile provided with transmitting mechanisms embodying my invention. Fig. 2 is a side elevation of the vehicle. Fig. 3 is an enlarged transverse section taken between the driving friction members and looking toward the rear. Fig. 4 is a bottom plan view of the same partly in section. Fig. 5 is an enlarged fragmentary view partly in longitudinal section of a part of the mechanism for adjusting the driving elements. Fig. 6 is a central transverse section taken along the transmission shafts. Fig. 7 is an enlarged fragmentary detail of a part of the mechanism for accelerating the adjustment of the driven friction members. Fig. 8 is a transverse section of the same taken along side the shaft for the idler rollers shown in Fig. 7. Fig. 9 is an enlarged sectional detail of a part of the mechanism for adjusting the driven friction members oppositely. Fig. 10 is an enlarged transverse section along side the adjusting racks and driven friction member or transmission shafts. Fig. 11 is an enlarged detail of the outboard bearing for the driven friction member or transmission shafts.

Figures 18, 19:
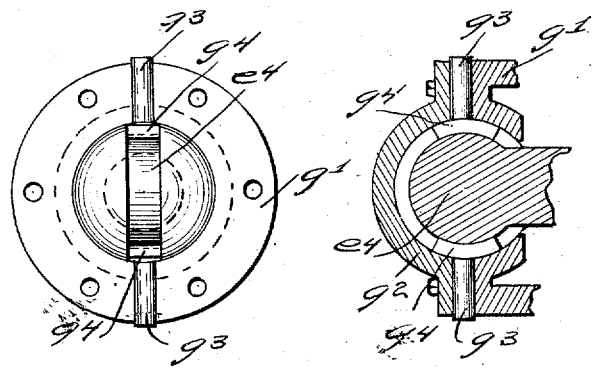

12 to 17 inclusive illustrate the construction of the reach rod and the brake mechanism and actuating means therefor. Figs. 18 and 19 are enlarged details of the outer ball and socket joint for the transmission shafts.

As shown in the drawings: A and A' indicate the side frame members or side sills of the chassis of a vehicle of any form or construction but for convenience shown as an automobile.

B, indicates the engine or motor, which, as shown, is supported at the forward end of the chassis upon a bar or shaft $b$, which extends transversely through the sills of the chassis and through the crank case in the engine affording a pivotal support for the motor. Extending rearwardly therefrom is a driving shaft $b'$, said shaft at its rear end is journaled upon a transverse sill or beam $b^2$, rigidly secured on said shaft are the parallel inwardly facing friction disks B' and B² the latter of which is arranged close to the beam or cross sill $b^2$. Journaled on said shaft $b'$ between the driving friction members is a housing or sleeve C provided on its under side with a downwardly directed cylindric boss $c$.

A casing D provided with a large central transverse aperture therethrough to receive said sleeve is provided at its laterally directed ends with ball shaped or spherical sockets to receive the spherically convex bearing pieces $e$, one of which is fitted in each end of said casing, as shown in Fig. 6, and is provided with an axial interior chamber to receive the rollers $e'$, of a roller bearing between which is journaled the end of the transmission shafts E and E, which extend transversely the chassis. As shown a follower $e^2$ for said rollers is adjustably secured in the end of said bearing case $e$, to hold said bearing in operative position about the shaft. The boss on the under side of the sleeve C extends downwardly into and fits in a downwardly extending tubular arm D', on said casing, as shown in Figs. 3 and 6, whereby the inner ends of said transmission shafts may be adjusted vertically, as hereinafter described. The outer ends of said shafts extend beyond the side sills A and A' and are each journaled in a suitable tubular bracket F, which is rigidly bolted to the side sill and extends a suitable distance beyond the same and as shown, is provided at its outer end with screw threads to receive the cones $f$—$f'$ of a ball bearing. Fitted over said cone is a sprocket wheel G within the hub of which is provided a race for the balls complemental with the cones. Said hub is provided on its inner side with an inwardly directed flange $g$, adapted to bear against a flange $f^2$, on said tubular bracket. On the outer side the hub is relatively long and in its outer end is provided with a spherically concave seat to receive the enlarged ball shaped end $e^4$, of the shaft E. Rigidly secured on said hub is a complemental cap $g^2$ which fits to the outer side of said ball, affording a ball and socket joint. Inwardly directed upper and lower cylindric studs $g^3$, each provided at its inner end with a foot piece $g^4$, curved to fit in a suitable recess in the top and the bottom of the ball project in the box for said ball, and insure the sprocket wheel driving with the shaft, but affording a universal joint inasmuch as the shaft may swing horizontally on the studs, and vertically on the foot pieces, the seats for said foot pieces having a greater width than the same.

Splined on each of the transmission shafts E, is a driven friction member H—H', which faces inwardly toward the driving shaft and is slidable radially of the driving friction members. Means are provided for adjusting the inner ends of said transmission shafts to bring one of said driven friction members into engagement with one of the driving friction members and the other into engagement with the other simultaneously and also to shift the same radially of the driving friction members and also to arrange each, if desired, obliquely with reference to the radius of contact with the driving friction members. For this purpose brackets or hangers F' integral with the tubular brackets F, extend below the sills, as shown in Figs. 3 and 10, and rigidly secured at the lower ends thereof transversely of the frame, is a tubular housing or casing I of a length to extend beyond the frame and support the side steps R, and provided in its top beneath each of the driven friction members, with a longitudinal slot, as shown in Fig. 6. Within said tubular casing is provided an upper and a lower rack $i$—$i'$ having inwardly facing oppositely disposed teeth with which intermeshes a gear $i^2$, rotation of which acts to adjust the rack oppositely. The hubs $h$—$h'$ of the respective driven friction members, are each provided with a peripheral flange $h^2$ about which engages a yoke $h^3$, secured to which is downwardly extending arm $h^4$, which extends through the slots in said casing, that for the friction member H, engaging the rack $i$, and that for the friction member H' engaging the lower rack $i'$. As shown said racks are provided at their ends with plane extensions which engage on opposite sides of flanged rollers $i^3$ and $i^4$ which are journaled on suitable shafts secured in the casing. Means are provided for actuating said racks to shift the friction member inwardly or outwardly comprising an outer tubular shaft or rotatable post K concentric with the steering post $k$, provided with a bevel gear $k'$ which meshes with a beveled gear $k^2$, secured on the shaft $k^3$, which at its opposite end is connected by means of any suitable universal joint with the shaft $k^4$, for said gear $i^2$, as shown in Figs. 5 and 9. Mechanism is provided for adjusting said driven friction members relatively to each other and the driving friction disk, one to engage its driving friction disk above its normal contact, the radius of the driving friction disk, and the other friction member to obliquely contact below its normal point of contact and obliquely the contact radius of the driving friction disk to accelerate automatically the outward movement of the friction members in starting the car. For this purpose a rack L is provided slidable on the casing I, and shaped to conform to the top thereof, and also longitudinally slotted in its top to correspond with the slot in the casing to receive the rod $h^4$ for the friction member H therethrough. Said rack is provided at its ends with sleeves $l-l'$ adapted to engage around and slide on said casing, but hold the rack in place thereon, and at its inner end is provided with a ball shaped boss $l^2$ which fits within the tubular arm D', and affords a universal joint therein. Journaled in a suitable bearing $l^3$ is a shaft $l^4$, on which is secured a geared segment $l^5$ which meshes with the rack L, as shown in Figs. 3, 5 and 7. Said shaft $l^4$, is provided at its extremity with a crank arm $l^6$, connected by means of a rod $l^7$, with a foot lever $l^8$ pivoted at its middle on a suitable support on the floor of the vehicle and which shifts the segment in either direction dependent on the end of the lever depressed thus tending to carry the lower end of the arm D', laterally in either direction to adjust the driven friction members, as shown in dotted lines in Fig. 3, or oppositely from the inclination shown in Fig. 3 in dotted lines, thus utilizing the rotation of the driving friction members to force the driven friction members radially outwardly either when driving ahead or when reversing.

For the purpose of adjusting the driven friction members into engagement with the driving friction members, an arm or lever M, is rigidly secured on the lower end of said arm D', as shown in Fig. 4; and pivotally engaged thereon, at its end is a connecting rod $m$. The opposite end of said rod is pivotally engaged on a lever $m'$, rigidly secured on a shaft $m^2$, which is journaled beneath the side sill in a long bearing box $m^6$ on the rack bar L. As shown, a lever $m^3$ directed oppositely from the lever $m'$, is provided on said shaft and engaged thereto is a rod $m^4$, connecting the same with the lower end of a hand lever M', provided with a toothed segment $m^5$ and detent $m^7$, as shown in Fig. 5, adjustment of the hand lever in one direction acts to throw the friction wheel or member H, into engagement with the driving friction disk B' and the friction wheel or member H, into engagement with the driving friction disk $B^2$, while adjustment of the lever in the opposite direction acts to reverse the engagement of said friction member. A stay rod $m^8$ pivoted on the frame at one end engages the top of the shaft $m^2$ pivotally, as shown in Fig. 5.

I have also shown in connection with my transmission mechanism an improved reach rod, chain guard and brake mechanism. For this purpose a metallic casing O, is provided which incloses the sprocket wheels on the transmission shaft, and on the rear axle and also incloses the chain. These guards may be constructed of pressed steel, cast aluminium or any suitable material, and are provided on the upper and lower sides with removable sections $o$ and $o'$, conveniently secured in place by means of screws and which afford access within, a bolt $o^5$ provided with a nut and lock nut is secured in the end of the casing and enables the axle to be spaced exactly from the bracket F against which the bolt bears.

As shown the brake contained in said casing is an expansion brake and comprising two sections $p$ which are pivoted to any suitable stationary part, (if desired to the side of the casing) and fit within a suitable flange $o^2$ on the rear sprocket wheel O'. Projecting also through the casing between the ends of the expansion members $p$ is a shaft $p'$ provided with oppositely directed cams thereon adapted to engage between and force the ends of the expansion members $p$ oppositely into engagement with said flange $o^2$. For the purpose of actuating the same, an arm $p^2$ is provided on the outer end of said shaft which is connected by means of a rod $p^3$, with an arm $p^4$ on a transverse shaft P, journaled beneath the side sills. A downwardly directed arm $p^5$ is provided on said shaft P in which is connected a rod $p^6$, which extends forwardly to a foot lever P' which is convenient of access to the operator and is provided with a pin to engage downwardly directed teeth $p^7$ on said rod $p^6$ and with a flange $p^8$ to engage forwardly directed teeth $p^9$ of a plate engaged to the floor and through which the lever P extends. A lever $P^2$, secured on the hand lever M', engages beneath the rod $p^6$ and lifts said rod to release the brake when the lever is actuated to start.

The operation is as follows:

The engine or motor drives the driving friction members continuously at the motor rate of speed which, of course, can be varied as desired and both driving friction members rotate in the same direction, being secured on the same driving shaft. Normally the driven friction members are out of engagement with the driving friction members as shown in Fig. 1. When it is desired to start the vehicle the lever M' is adjusted to throw the driven friction members into engagement with the appropriate driving friction members dependent whether the vehicle is to be driven ahead or reversely and the accelerator lever 18 is actuated to set the driven friction members obliquely with the contact radius of its driving friction member so that the pressure exerted by the lever M' to force the driven friction member against the driving friction members causes the driving friction members by their rotation, to gradually force the driven friction members outwardly and the engine rate being uniform, accelerating the rate of the driven friction members and the motion of the car. When the car has attained sufficient rate of speed, the accelerator lever is released, permitting the driven friction members to again assume a position at right angles with the driving radius, of course, in retracting the driven friction members in stopping or when employing the driven friction members as a brake the inward movement of the driven friction members may be aided by reversely adjusting the accelerator lever, and by the use of the accelerator less wear is occasioned on the friction faces than when the friction members are shifted otherwise. The accelerator also greatly relieves the labor necessary in shifting the friction members to vary speed. Of course, in a device such as described the friction members operate as a powerful brake when desired and enable the car to be stopped or reversed much more quickly than possible with other types of transmission mechanisms. Furthermore all the mechanisms for shifting the driven friction members and for operating the vehicle are positioned below the floor, thus carrying the center of gravity lower than usual. The ends of the tubular casing containing a part of the shifting mechanism for the driven friction members afford a bracket or support for the side step R, as shown in Figs. 2 and 10, thus enabling the said casing to be made of sufficient length to afford great amplitude of adjustment for the driven friction members.

Obviously the combined reach rod and chain guard, afford a suitable connection between the adjustable transmission shaft E, and rear axle to insure the effective transmission to the same at all time. Obviously the friction members may be shifted automatically by means of the accelerator or mechanically by means of a suitable hand wheel on the outer post K.

Many details of construction may be varied without departing from the principles of this invention.

I claim as my invention:

1. In a friction transmission mechanism of the class described the combination with the driving friction members of driven friction members, means for adjusting the driven friction members obliquely to the contact radius of the driving friction members and simultaneously shifting the driven friction members on different horizontal planes, whereby the driving friction members automatically move the driven friction members across the faces thereof.

2. In a friction transmission mechanism the combination with a driving shaft of a friction member thereon, a transmission shaft, a driven friction member thereon adapted to engage the driving friction member, means for shifting the driven friction member to contact the driving friction member above and below the normal radius of contact and at an angle therewith, a universal joint for each end of said transmission shaft and means for moving the inner end of the transmission shaft to throw the friction members into engagement.

3. In a device of the class described the combination with one or more driving friction members of one or more driven friction members arranged in operative relation thereto, means for adjusting the driven friction members into engagement with the driving friction member or members, and means for simultaneously adjusting one or more of the driven friction members obliquely with the contact radius of the driving friction member and above or below its normal point of contact, to automatically shift the driven friction members outwardly, or inwardly.

4. In a device of the class described the combination with one or more driving friction members, of one or more driven friction members arranged in operative relation thereto, means for adjusting the driven friction members into engagement with the driving friction member or members, means for simultaneously adjusting one or more of the driven friction members obliquely with the contact radius of the driving friction members and above or below the normal point of contact, and means for manually adjusting said driving friction members inwardly or outwardly along the radius of the driving friction members.

5. In a device of the class described the combination with a pair of parallel driving friction members, of a pair of driven friction members disposed on opposite sides of the center thereof, means for adjusting the driven friction members one into engagement with one of the driving friction members, the other into engagement with the other, a casing supported below the friction members, rack bars in said casing, said bars at each end being without teeth, friction rollers between said bars, means operatively connecting the bars and the driven friction members and means for manually actuating the rack bars oppositely thereby shifting the driven friction members radially across the face of the driving friction members.

6. In a friction transmission mechanism the combination with a driving friction member of a driven friction member capable of contacting the same on different horizontal planes and adapted to be arranged obliquely with the radius of contact of the driving friction member, thereby tending to shift the driven friction member radially of the driving friction member.

7. In a friction transmission device the combination with a frame of a driving friction member, a driven friction member capable of contacting the same, a casing supported by the frame and positioned beneath the driven friction member, a shaft extending into the casing, a gear on said shaft in the casing, rack bars in said casing actuated by said gear, operative connections between said rack bars and the driven friction member, a shaft connected to the aforesaid shaft by means affording a universal joint and manual means for actuating said shaft.

8. In a friction transmission device the combination with a driving friction member of a driven friction member capable of contacting the same and adapted to be arranged obliquely with the radius of contact of the driving friction member and adapted to be elevated or depressed, thereby tending to shift the driven friction member radially of the driving friction members and a lever for shifting one of said friction members into positive contact with the other.

9. In a device of the class described the combination with a driving friction member, of a driven friction member, means for adjusting one of said friction members to and from the face of the other, a lever connected with the hub of the driven friction member and acting to adjust the same to vary the angle of contact thereof with the radius of contact of the driving friction member and to elevate or depress said driven friction member.

10. In a device of the class described the combination with a driving friction member of a driven friction member, means for adjusting one of said friction members to and from the face of the other, a lever connected with the hub of the driven friction member and acting to adjust the same to vary the angle of contact thereof with the radius of contact of the driving friction member and to elevate or depress the driven friction member to contact the driving friction members on different horizontal planes.

11. In a device of the class described the combination with a driving shaft of oppositely disposed inwardly facing driving friction members each rigidly secured on the driving shaft, a casing pivotally supported on the driving shaft between said members, oppositely directed transmission shafts journaled in the ends of said casing and on the frame, universal joints at the ends of each transmission shaft, a driven friction member slidable on each transmission shaft, means adapted to swing the casing to carry the driven friction members into and out of engagement with the driving friction members and means for varying the angle of contact of the driven friction members with the radius of the driving friction members.

12. In a device of the class described the combination with the oppositely disposed inwardly facing driving friction members rigidly secured on the driving shaft, of a casing pivotally supported on the driving shaft between said members, oppositely directed transverse transmission shafts journaled in the ends of the casing and on the frame, means affording universal joints for the transmission shafts, a driven friction member feathered to slide on each transmission shaft, a lever adapted to swing the driven friction members into engagement one with each driving friction member and means to simultaneously elevate one driven friction member and depress the other to vary the angle of contact with the driving friction member.

13. In a device of the class described the combination with oppositely disposed inwardly facing driving friction members, each rigidly secured on the driving shaft, of a casing pivotally supported on the driving shaft between said members, oppositely directed transverse transmission shafts journaled in the ends of said casing and on the frame, means affording universal joints for said shafts, a driven friction member feathered to slide on each transmission shaft, mechanism acting below the transmission to swing the driven friction members into and out of engagement with the driving friction members, a lever acting to elevate the inner end of one transmission shaft and depress the inner end of the other to vary the angle of the driven friction members with the radius of contact on the driving friction members and means also acting from below for shifting the driven friction members on their shafts.

14. In a device of the class described the combination with the oppositely disposed inwardly facing driving friction members rigidly secured on the driving shaft, of a casing pivotally supported on the driving shaft between said members, oppositely directed transverse transmission shafts, journaled in the ends of said casing and on the frame, means affording universal joints for said transmission shafts, a driven friction member feathered on each transmission shaft, a downwardly directed arm on said casing, a lever thereon adapted to swing said casing horizontally to engage the driven and the driving friction members and means engaging the lower end of the arm and acting to swing the same transversely thereby elevating one driven friction member and depressing the other and varying the driving contact with the driving friction member.

15. In a device of the class described the combination with inwardly facing driving friction members, of a driving shaft connecting the same, a casing pivoted on the drive shaft, transverse transmission shafts journaled in the ends of the casing and on the frame, a universal joint for each end of said transmission shafts, a driven friction member feathered on each transmission shaft, a downwardly directed arm at the middle of the casing, adapted to swing said casing horizontally, a lever thereon for bringing said driven friction members into engagement, each with either of the driving friction members, means for shifting the driven friction members radially on the driving friction members and means engaging the lower end of said arm, and acting to vary the angular adjustment of the driven friction members with the radius of contact of the driving friction members.

16. In a device of the class described the combination with a driving shaft of driving friction members engaged thereon, transmission shafts, driven friction members engaged thereon and extending between said driving friction members, means for adjusting said driven friction members to contact one with each of said driving friction members, a slotted casing depending below the driving shaft, friction rollers journaled in said casing, rack bars one supported by said rollers, a rod rigidly secured to each rack bar and extending through the slots in the casing and operatively connected to the driving friction members and means shifting the rack bars to vary the point of contact of the driven friction members.

17. In a transmission mechanism the combination with a support of a driving shaft journaled therein, inwardly facing friction members engaged to the driving shaft, transmission shafts extending transversely of the driving shaft, driven friction members on said transmission shafts, a casing supporting the adjacent ends of the transmission shafts, means adapted to actuate the casing to simultaneously move the driven friction members to engage opposite driving friction members and means for actuating the casing to elevate one end and depress the opposite end thereof thereby shifting the point of contact of the driven friction members above and below the normal contact point.

18. In a device of the class described the combination with a support of a driving shaft journaled thereto, driving friction members secured thereon, transmission shafts, a universal joint at each end of said transmission shafts, a driven friction member engaged on each transmission shaft between the driving friction members, means adapted to move said driven friction members to contact either driving friction member and means adapted to elevate or depress either driven friction member.

19. In a device of the class described, the combination with a support of a driving shaft engaged thereto, driving friction members carried on said shaft, transmission shafts extending transversely of the driving shaft, a driven friction member on each transmission shaft, means adapted to move said driven friction members oppositely to engage either driving friction member and means adapted to adjust said driven friction members obliquely with the radius of contact.

20. In a device of the class described the combination with a frame or support of a driving shaft engaged thereto, friction members carried thereby, transmission shafts journaled adjacent the driving shaft, a driven friction member on each, means adapted to simultaneously move the driven friction members to contact with different driving friction members and means adapted to shift the driven friction members to contact with the driving friction members on a different radius than normal and obliquely with the contact radius.

21. In a device of the class described the combination with a frame or support of oppositely disposed driving friction members, driven friction members positioned between said driving friction members, means adapted to throw said driven friction members one to engage one driving friction member and the other the opposite driving friction member and means adapted to elevate or depress either driven friction member when contacting with either driving friction member.

22. In a device of the class described the combination with driving friction members of driven friction members between the same, adapted to engage the driving friction members and means for varying the radius of contact of the driving and driven friction members and the angle of contact at any radius.

23. In a device of the class described the combination with inwardly facing driving friction members of driven friction members between the same, a shaft for each driven friction member, universal joints for said shafts, means adapted to oscillate the driven friction members horizontally to engage opposite driving friction members and means adapted to oscillate the driven friction members vertically to change the radius of contact and the angle of contact.

24. In a device of the class described the combination with driving friction members of driven friction members engaged therebetween means adapted to oscillate said driven friction members in one direction to contact with the driving friction members and means adapted to oscillate the driven friction members to vary the radius and the angle of contact.

25. In a device of the class described the combination with driving friction members of driven friction members between the same, means for adjusting said driven friction members oppositely to contact said driving friction members, and means varying the radius and angle of contact of the driven friction members whereby said driven friction members are automatically moved across the face of the driving friction members.

26. In a device of the class described the combination with driving friction members of a plurality of driven friction members between the inner faces thereof, means for oscillating the driven friction members to contact the driving friction members and a plurality of means adapted to move the driven friction members radially of the driving friction members, one of said means being adapted to vary the angle of contact with the radius whereby the driven friction members are automatically actuated.

27. In a device of the class described the combination with a frame of a driving shaft carried thereby, driving friction members thereon, a casing carried by the driving shaft, transmission shafts extending transversely of the driving shaft, a driven friction member on each, means adapted to throw the driven friction members and driving friction members into contact, a rack bar beneath said frame, a universal joint connecting the same and casing, a geared segment intermeshing with said rack bar and a lever connected therewith adapted when actuated to elevate or depress the point of contact between said driven and driving friction members.

28. In a device of the class described the combination with a casing of a driving shaft journaled thereto, a casing supported thereby, transmission shafts journaled in said casing and to the frame, friction members on said driving shaft and transmission shafts normally out of contact, means for throwing the same into contact, a tubular casing supported beneath the frame, rack bars therein, anti-friction rollers for said rack bars, a rod connecting each of said rack bars and one of the friction members on the transmission shaft, a shaft journaled in the tubular casing, a gear thereon intermeshing with said rack bars and a lever connected to said gear shaft adapted by operation thereof to force said friction members on the transmission shaft inwardly and outwardly.

29. In a device of the class described the combination with driving friction members of shafts adjacent the same, driven friction members thereon, means adapted to adjust said friction members whereby one driven friction member and driving member contact simultaneously with the contacting of the other driving and driven friction member and means adapted to elevate either driven friction member when contacting either driving friction member to vary the radius of contact.

30. In a device of the class described the combination with driving friction members of driven friction members, means adapted to throw the driven friction members to singly contact the driving friction members and means adapted to move either driven friction member to contact the driving friction member below the normal radius of contact.

31. In a device of the class described the combination with driving friction members of driven friction members between the same and normally out of contact therewith, means adapted to rock the driven friction members oppositely each to contact one of the driving friction members, mechanism for varying both the angle and radius of contact of the driven friction members and a foot lever operatively connected with the same.

32. In a device of the class described the combination with a shaft of driving friction members thereon, transmission shafts, a universal joint at each end thereof, a sprocket wheel engaged at one end of each transmission shaft, a roller bearing at one end of each transmission shaft, a driven friction member on each transmission shaft, means adapted to rock said driven friction members oppositely, one to contact either driving friction member and manually actuated means for moving said driven friction members relatively of the driving friction members.

33. In a device of the class described the combination with a shaft of inwardly facing friction members thereon, shafts extending transversely of said shaft, a friction member on each transverse shaft, means for rocking said transverse shafts to throw said friction members to contact the inwardly facing friction members and means for rocking said transverse shafts to adjust the radius of contact between said friction members and the angle of contact.

34. In a transmission device the combination with the frame and axles of a driving shaft journaled on the frame, driving friction members thereon, transmission shafts journaled transversely of the driving shaft, a universal joint for each end of the transmission shaft, driven friction members on said transmission shafts, adapted to contact the driving friction members, a sprocket wheel rotatable with each transmission shaft, sprocket wheels secured on one of said axles, chains trained around said sprockets, a guard protecting said chains and sprockets from injury and means adjusting the tension of the chains.

35. In a device of the class described the combination with a frame and axles of a driving shaft, friction members secured thereon, transmission shafts journaled on said frame, friction members secured thereon, sprocket wheels rigidly secured on the transmission shafts, and axles, transmitting chains trained around the same, means moving the inner ends of the transmission shafts to throw its friction members to contact the friction members on the driving shaft, means adjusting the opposite ends of the transmission shafts to vary the tension on the transmitting chains and a metallic guard protecting the chains and sprockets from injury.

In testimony whereof I have hereunto subscribed my name in the presence of two subscribing witnesses.

WILLIAM O. WORTH.

Witnesses:
K. E. HANNAH,
C. W. HILLS.